United States Patent
Nahari

(10) Patent No.: US 9,356,930 B2
(45) Date of Patent: May 31, 2016

(54) SECURE RANDOMIZED INPUT

(71) Applicant: PayPal, Inc., San Jose, CA (US)

(72) Inventor: Hadi Nahari, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/281,162

(22) Filed: May 19, 2014

(65) Prior Publication Data

US 2014/0250507 A1 Sep. 4, 2014

Related U.S. Application Data

(63) Continuation of application No. 13/035,542, filed on Feb. 25, 2011, now Pat. No. 8,731,197.

(60) Provisional application No. 61/312,054, filed on Mar. 9, 2010.

(51) Int. Cl.
 *H04L 29/06* (2006.01)
 *G06F 21/46* (2013.01)

(52) U.S. Cl.
 CPC .............. *H04L 63/083* (2013.01); *G06F 21/46* (2013.01); *H04L 63/0492* (2013.01)

(58) Field of Classification Search
 CPC ................................. H04L 63/06; G06F 21/46
 See application file for complete search history.

(56) References Cited

U.S. PATENT DOCUMENTS

| | | | | |
|---|---|---|---|---|
| 7,069,584 | B1* | 6/2006 | Davis | 726/5 |
| 7,178,025 | B2* | 2/2007 | Scheidt et al. | 713/168 |
| 7,735,120 | B2* | 6/2010 | Wallace et al. | 726/5 |
| 8,495,710 | B2* | 7/2013 | Barnes et al. | 726/4 |
| 2001/0018330 | A1* | 8/2001 | Yamauchi | 455/41 |
| 2002/0071554 | A1* | 6/2002 | Scheidt et al. | 380/44 |
| 2004/0165726 | A1* | 8/2004 | Yamamichi et al. | 380/277 |
| 2005/0147250 | A1* | 7/2005 | Tang | 380/259 |
| 2005/0254650 | A1* | 11/2005 | Sakurai et al. | 380/268 |
| 2006/0206919 | A1* | 9/2006 | Montgomery et al. | 726/2 |
| 2007/0174611 | A1* | 7/2007 | Urban et al. | 713/168 |
| 2008/0022119 | A1* | 1/2008 | Lim et al. | 713/183 |
| 2008/0184036 | A1* | 7/2008 | Kavsan | 713/184 |
| 2009/0106561 | A1* | 4/2009 | Ejiri | 713/193 |
| 2009/0126018 | A1* | 5/2009 | Keohane et al. | 726/23 |
| 2009/0150983 | A1* | 6/2009 | Saxena et al. | 726/7 |
| 2009/0319782 | A1* | 12/2009 | Lee | 713/156 |
| 2010/0161927 | A1* | 6/2010 | Sprouse et al. | 711/163 |
| 2010/0174758 | A1* | 7/2010 | Radenkovic et al. | 707/803 |
| 2011/0296509 | A1* | 12/2011 | Todorov | 726/7 |

* cited by examiner

*Primary Examiner* — Morshed Mehedi
(74) *Attorney, Agent, or Firm* — Haynes and Boone, LLP

(57) ABSTRACT

A user inserts a received random sequence into the user's password or PIN. The user enters and transmits this randomized password to a service provider. The service provider extracts the password to determine whether to authenticate the user.

20 Claims, 3 Drawing Sheets

SECURE RANDOMIZED INPUT

CROSS REFERENCE TO RELATED APPLICATIONS

This application is a continuation of U.S. patent application Ser. No. 13/035,542, filed Feb. 25, 2011, which claims priority to U.S. Provisional Patent Application Ser. No. 61/312,054, filed Mar. 9, 2010, all of which are incorporated herein by reference in their entirety.

BACKGROUND

1. Field of the Invention

The present invention generally relates to user authentication, and in particular, to use of passwords for authentication.

2. Related Art

With the ever-increasing use of the Internet and other electronic communication, more and more sensitive information is being communicated electronically. Such sensitive information may include social security numbers, passwords, date of birth, mother's maiden name, PINs, account numbers, etc. Fraudsters acquiring such information may result in identity theft, unauthorized use of funds, etc. Thus, capturing this important information is one of the targets of hackers and malicious applications.

One of the easiest ways of mounting this attack is for the malicious application to "listen" to keystrokes and record the sequence of the keys that the user has entered. This is also known as a "key-logging" attack. Protecting against key-logging attack is a nontrivial task that demands deep modifications performed to the operating environment to ensure that the malicious listeners are detected and blocked. The problem becomes more difficult to solve when a sensitive piece of code that has security requirements (such as protecting the user's credentials) is running inside a non-secure environment. The "environment" in this context is either another application or the operating system as a whole. The problem is equally applicable to personal computers (PC) that use a physical keyboard, as well as devices that deploy a touch-screen keyboard, such as Apple iPhone, pop-up virtual keyboard, or other data input means.

Sensitive information is often required to authenticate the user so that a service provider, such as a financial institution or merchant, can be reasonably sure the user is who he says he is. Without user authentication, the transaction may not be allowed to proceed.

Therefore, a need exists to provide the user a more secure way of entering and electronically transmitting sensitive information.

SUMMARY

In one embodiment, a user inserts a random sequence of letters, numbers, characters, and/or symbols into the user's password or PIN. The random sequence is generated from a system that will require authentication for access, such as a payment provider, financial institution, retailer, etc. The random sequence is transmitted to the user and displayed on a user device. During a log-in process, the user enters the user's password or PIN with the random sequence appended at the beginning or end of the password or PIN. The random sequence may also be inserted in the middle of the password, such that the random sequence separates the password into two portions, or broken up and inserted throughout the password. The password plus random sequence is then transmitted to the system authenticating the user. Because the transmitted "password" has a random generated sequence, anyone intercepting the transmission without knowledge of the actual random generated sequence would not be able to determine the actual password.

Once received by the system, the system, knowing the random generated sequence, can extract the sequence from the received transmission to determine the actual user password. The system can then use the password to authenticate (allow access) or deny access to the user.

In one embodiment, the system generates a random sequence of characters, which can be any length and any combination of letters (capital or lowercase), symbols, numbers, or characters. Each time a user (whether it be the same or different) attempts to log in or access content, another random sequence is generated, which can be of different lengths and types.

The random sequence is sent to the user, such as through the device the user is using to access the system. The device may be a mobile device (such as a smart phone), a PC, laptop, or any communication device used to access content on a system.

The user is then asked to enter the received random sequence into the user's password. Note that the user can be requested to enter the sequence at a specific location (e.g., at the end, beginning, or somewhere in the middle, such as after the second character in the password). If the user is requested to enter the random sequence in a particular location, this may vary each time the user attempts to log in or access content. For example, one time the user may be asked to insert the random sequence at the beginning of the credential, another time at the end, and another time somewhere in the middle. Alternatively, the user may enter the sequence anywhere in the password, based solely on the user's discretion without specific guidance from the system.

The system then receives the "password," which includes the random sequence within the real password. The system determines the actual password by extracting the random sequence. If the credentials are sent in clear (i.e., received in the same format as the user enters them), then eliminating or extracting the random sequence will produce the actual password or credential. If the password is sent in hash format, then the system could extract the password since it knows the correct has. If the password is sent as a function of the password plus random sequence, the system could extract the actual password by applying a reverse or inverse function to the received password and removing the random sequence.

In other embodiments, the system may ask the user to insert numbers, characters, symbols or letters if the user-selected password is "weak," e.g., a user name or other easily determined identifier. This may make it more difficult for hackers to extract the actual password from an intercepted transmission having a random sequence embedded. The system may have checks that prevent a hacker from attempting multiple password entries, e.g., after three unsuccessful attempts, the user is not allowed to enter another password. This may help prevent hackers from simply trying different iterations of the intercepted transmission and guess what the actual password or credential is.

Since the system knows the random sequence, algorithms can be put in place that detect when someone is trying to guess the password by taking out portions of the random sequence. This would increase security of the randomized password. The random sequence may be generated with knowledge of the actual user password. For example, when the user attempts to log in or access content, a user identifier, such as a username, email, or phone number, may be transmitted to the system. The system can then access that user's password.

The random sequence generator can use this password to generate repetitions of the characters in the actual password, thereby making it more difficult for a hacker to determine what is the random sequence.

In another embodiment, a hash can be used for a quick lookup to determine whether a received password is authentic. For example, if there are at most five characters in the sequence and, say, six characters in the password, then there may be 30 (5×6) password attempts. This could be optimized when the random sequence is generated. The system could create all the 30 possibilities and get a hash on the fly (in memory) and when the response is received, get a hash and do a quick lookup. If there is a match, then the user is authenticated.

Thus, using the random sequence within a password to authenticate a user provides additional security from hackers. Any listener or hacker who receives the random sequence within the password without knowledge of the random sequence would not be able to determine the actual user password because the sequence is randomly generated.

These and other features and advantages of the present invention will be more readily apparent from the detailed description of the embodiments set forth below taken in conjunction with the accompanying drawings.

Figure 1:
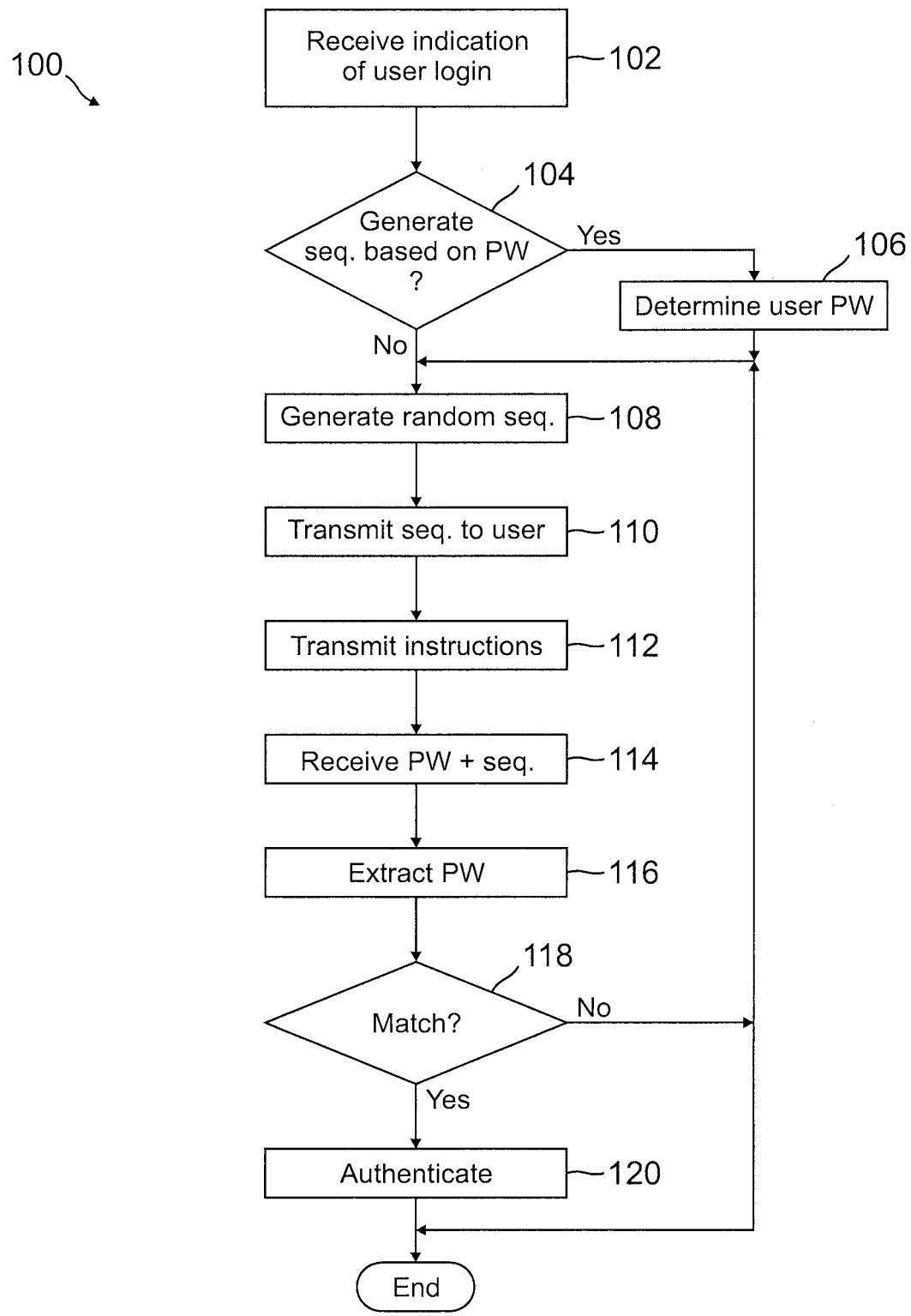
FIG. 1 shows a process for authenticating a user using a random sequence within a password according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for authenticating a user using a random sequence within a password according to one embodiment. At step 102, a system receives an indication from the user that the user wishes to log into or access a site. The system can be with an online merchant, financial institution, payment provider, such as PayPal, Inc. of San Jose, Calif., government site, or any entity or person that requires authentication from a user before allowing that user access to content. The content may be contain private information of the user, allow the user access to paid content or other services, etc.

The indication may be received from the user's mobile device, tablet, PC, laptop, or other computing/communication device through any suitable wired or wireless means, including through the Internet, phone channels, NFC, etc. In one embodiment, the indication is conveyed by the user when the user first accesses the system's website, such as by entering the URL of the system's home page, such that the system is able to obtain information from the device, such as cookies, device IDs, etc. Other ways include the user actively transmitting the indication, such as selecting a login link or button, and/or entering a user identifier, such as an email address, phone number, or user name. The user identifier enables the system to locate the user's password.

Next, the system determines, at step 104, whether to generate the random sequence based on the user's password. The determination may include looking at characteristics or traits of the user's password, including, but not limited to, its relative "strength" or "weakness", its length, the type of characters used in the password, or just system or user settings/preferences. For example, if the user's password is "weak," the system may want to generate the random sequence based on the password so that it is harder for the password to be extracted when combined with the random sequence. If the password is a recognizable name, phrase, or other sequence of characters, adding in a random sequence may still make the password recognizable. Thus, the system may want to generate a more specific "random" sequence based on the particular password to make extraction of the password more difficult. Examples will be provided later in the description.

If, as determined at step 104, the random sequence will be based on the user's password, the system determines the user password at step 106. By knowing the user's identifier, the system can typically obtain the user's password. If not, the system may request the user for information that allows the system to obtain the password. Note that determination of the user password may take place before step 104. In that embodiment, the determination of whether to generate the random sequence based on the user password may be based, at least in part, on characteristics of the user password.

Next, the random sequence is generated, at step 108, by the system. If the random sequence is not based on the user password, the random sequence can be completely random, with random lengths and/or random types or combinations of characters. The characters can be upper case letters, lower case letters, symbols, numbers, or characters. In one embodiment, the characters include only what is available on a standard keyboard or keypad, which makes it easier for the user to enter the sequence. Lengths may vary from one character to any number, although there are practical limitations to the maximum amount. Also, shorter length sequences may not be as secure as longer length sequences. One example show how difficult it could be to extract the actual password. Say the user password is "mike#R45jZ," and the random sequence is "k%RU!9$." The combination of the two may be either "k%RU!9$mike#R45jZ" or "mike#R45jZ k%RU!9$," both of which would be very hard for someone to determine the actual user password from.

If the random sequence is based on the user password, the random sequence is not entirely random. For example, if user password is a recognizable word or phrase, the random sequence may start or end with characters that make it harder for someone to know when the real password starts/stops and when the random sequence starts/stops. This can include adding repetitions of characters from the user password or inserting characters that still make portions of the password plus sequence recognizable. By illustration, say a user password is "mary120372," which is a relative "weak" password having a name and a typical calendar sequence (maybe a date of birth or anniversary). With such a password, the random sequence may be "gray113475rose." Attaching this sequence to the beginning of the user password results in "gray113475rosemary120372," making it more difficult to extract the original password.

In another embodiment, with weaker passwords, the system may use a specific first sub-sequence and randomly generate a second sub-sequence, where the combination of the two sub-sequences is the "random" sequence. Using the above example, the first sub-sequence may be "rose" and then the second sub-sequence is completely random but always attached in front of "rose."

Once the random sequence is generated, the system transmits the random sequence to the user at step 110. In one embodiment, the random sequence is presented visually, such as through SMS, email, or on a screen of the system (e.g., the same or different screen where the user first accesses the system site on the user's PC/laptop). The random sequence may also be presented audibly, such as with an automated voice message to the user's phone, mobile device, or a voice file attached to an email sent to the user. Note that the random sequence need not be presented on the same device the user accessed the system site from. This results in higher security because the random sequence is sent to a separate known user device. Thus, if a fraudster is attempted to access the user's account through a user device, such as the user's PC, the fraudster may not also have access to a separate user device, such as the user's phone.

Along with or separate from the random sequence, instructions, if any, are also transmitted, at step 112, to the user. Instructions may inform the user what to do with the received random sequence. For example, the user may be asked to insert the random sequence at the beginning of the user's password and enter the result instead of the user's actual password. Other examples include inserting the random sequence at the end of the user's password or within the user's password. For the latter, examples include inserting the sequence after the first character, after the second character, before the last character, before the second to last character, etc. The instructions may also be for the user to insert the sequence anywhere along or within the user's password.

After the user modifies the password with the random sequence as instructed, the system receives, at step 114, the password plus random sequence or randomized password. Reception is typically accomplished by the user clicking on a link or button that causes a communication back to the system through the system site. However, other means may also be suitable, such as through another user device, email, text, voice, etc. The randomized password may be received in different forms. One form is clear text (i.e., received in the same format as the user enters the randomized password). Another form is a hash value, in which the randomized password is used in a hash function to return a hash value to the system. Yet another form is sequence obtained from using the randomized password as input to a function, i.e., F(randomized password). Other forms may also be suitable.

Once received, the system extracts the actual user password at step 116, using its knowledge of the random sequence and any other information. In the first form above, the system looks for the random sequence within the randomized password and removes the random sequence, thereby revealing the user password. In the second form above, knowledge of the hash function and the randomized password allows the system to know what the expected hash value should be, i.e., Hash(randomized password). In the third form above, knowledge of the function enables the system to apply an inverse function to the received data to obtain the user password, i.e., $F^{-1}$ (F(randomized password)).

After the password or equivalent is obtained, the system determines, at step 118, whether there is a match. If the actual user password is extracted, the system compares the extracted password with the password associated the user (e.g., the user identifier). If the system receives a value (such as through a hash), the system compares the received value with the expected value (where the known randomized password is used in the hash function). If the system receives a function, the system applies the inverse function to obtain the randomized password.

If a match is determined, i.e., the received data is what is expected for the user, the system authenticates the user at step 120. The system may send a confirmation or successful notification to the user that the user has been authenticated. The system may then provide access to the site or any other suitable action. For example, the system may allow the user to access his account, view certain information, make purchases, etc.

However, if the system determines there is not a match in step 118, the may end the process and not authenticate or allow access to the user. In another embodiment, the system may give the user additional attempts to be authenticated. If that is the case, the system generates another random sequence at step 108, and the same steps are performed as before. Note that even if the same session, a new random sequence is generated each time the user attempts to authenticate. This provides additional security. If the system has not been able to authenticate the user after the predetermined amount of attempts, the process ends without the user being authenticated.

Thus, by having a user insert a random sequence within the user's password for authentication, a system is able to authenticate a user while minimizing the risk that the user's password will be intercepted or otherwise obtained by an unauthorized system, program, entity or person.

In one use case, the user may first need to be identified as human, as opposed to machine. This can be accomplished in any number of ways. One way is to transmit a distorted image or phrase, such as Captcha, to the user. The user is then asked to enter the distorted image and transmit an undistorted image back to the system. If the received image matches or is what is expected, the system verifies the user is human and proceeds with generating the random sequence as discussed above.

Figure 2:
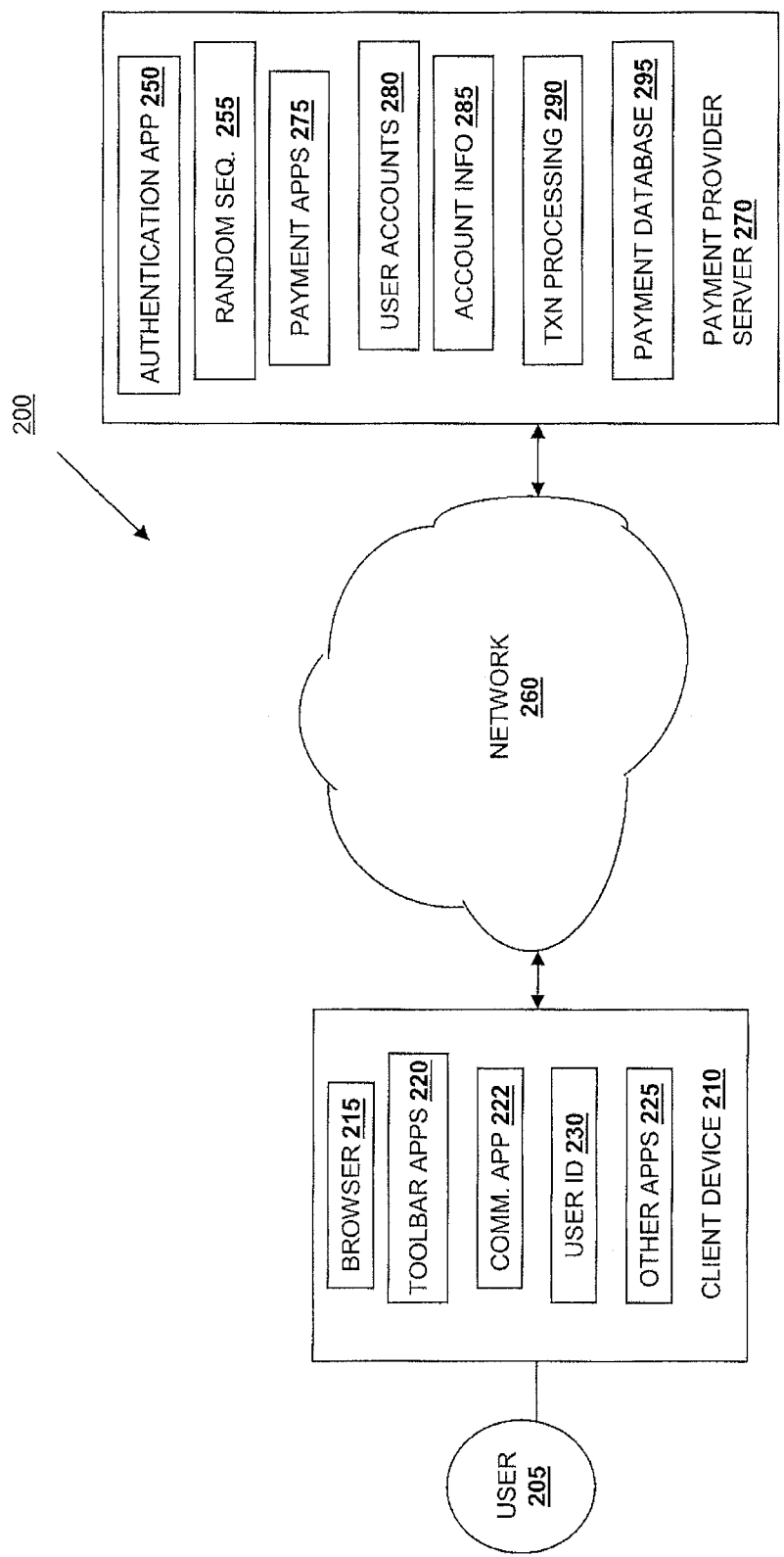
FIG. 2 is block diagram of a networked system suitable for implementing the process of FIG. 1 according to an embodiment.

FIG. 2 is a block diagram of a networked system 200 configured to handle a communication, such as authentication, between a service provider and a user, such as described above, in accordance with an embodiment of the invention. System 200 includes a user device 210 and a payment provider server 270 in communication over a network 260. Payment provider server 270 may be maintained by a payment provider, such as PayPal, Inc. of San Jose, Calif. A user 205 utilizes user device 210 to communicate, such as for authentication, information access, or to perform a transaction, with payment provider server 270. Note that payment provider server 270 may be a server maintained by any entity, person, company or service that authenticates a user. Examples include financial institutions, merchant sites, universities, schools, associations, clubs, etc.

User device 210 and payment provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

User device 210 may be implemented using any appropriate hardware and software configured for wired and/or wireless communication over network 260. For example, in one embodiment, user device 210 may be implemented as a personal computer (PC), a smart phone, personal digital assistant (PDA), laptop computer, and/or other types of computing devices capable of transmitting and/or receiving data, such as an iPad™ from Apple™.

User device 210 may include one or more browser applications 215 which may be used, for example, to provide a convenient interface to permit user 205 to browse, search, and access information available over network 260. For example, in one embodiment, browser application 215 may be implemented as a web browser configured to view information available over the Internet. User device 210 may also include one or more toolbar applications 220 which may be used, for example, to provide client-side processing for performing desired tasks in response to operations selected by user 205. In one embodiment, toolbar application 220 may display a user interface in connection with browser application 215.

User device 210 may further include other applications 225 as may be desired in particular embodiments to provide desired features to user device 210. For example, other applications 225 may include security applications for implementing client-side security features, programmatic client applications for interfacing with appropriate application programming interfaces (APIs) over network 460, or other types of applications. Applications 225 may also include email, texting, voice and IM applications that allow user 205 to send and receive emails, calls, texts, and other ways to communicate through network 260 to payment provider server 270. User device 210 includes one or more user identifiers 230 which may be implemented, for example, as operating system registry entries, cookies associated with browser application 215, identifiers associated with hardware of user device 210, or other appropriate identifiers, such as used for user and/or device authentication. In one embodiment, user identifier 230 may be used by a payment service provider to associate user 205 with a particular account maintained by the payment provider as further described herein. A communications application 222, with associated interfaces, enables user device 210 to communicate with payment provider server 270, as well as other devices within system 200.

Payment provider server 270 may be maintained, for example, by an online payment service provider which may provide payment services from user 205. Before using the services of the payment provider, user 205 may need to be authenticated first. This may be accomplished, in part, by an authentication application 250 and a random sequence generator 255. Authentication application 250 may be used to authenticate user 205 when the user attempts to access information associated with the user's account with the payment provider, make payments or use other services of the payment provider, and other reasons in which the user must first be authenticated by the payment provider. Random sequence generator 255, which may be separate or part of authentication application 250, generates random sequences that are transmitted to user 205, such as via user device 210, for the user to insert within the user's password, as discussed above. Random sequence generator 255 may generate completely random sequences or pseudo-random sequences based on the user password. In one embodiment, each time a user is asked to enter a password, a new random sequence is generated.

Recipients of user payments may be merchants, charities, retailers, online marketplaces, individuals, etc. In this regard, payment provider server 270 includes one or more payment applications 275 which may be configured to interact with user device 210 over network 460 to facilitate payments by user 205 to others.

Payment provider server 270 also maintains a plurality of user accounts 280, each of which may include account information 285 associated with individual users and merchants. For example, account information 285 may include private financial information of users of devices such as account numbers, passwords, device identifiers, user names, phone numbers, credit card information, bank information, purchase code conditions, or other financial information which may be used to facilitate online transactions by user 205. Advantageously, payment application 275 may be configured to interact with user 205 during a transaction to make the appropriate payment to a desired recipient.

A transaction processing application 290, which may be part of or separate from payment application 275, may be configured to receive information from a user device for processing and storage in a payment database 295. Transaction processing application 290 may include one or more applications to process information from user 205 for processing a payment or other service. Payment application 275 may be further configured to determine the existence of and to manage accounts for user 205, as well as create new accounts if necessary.

Figure 3:
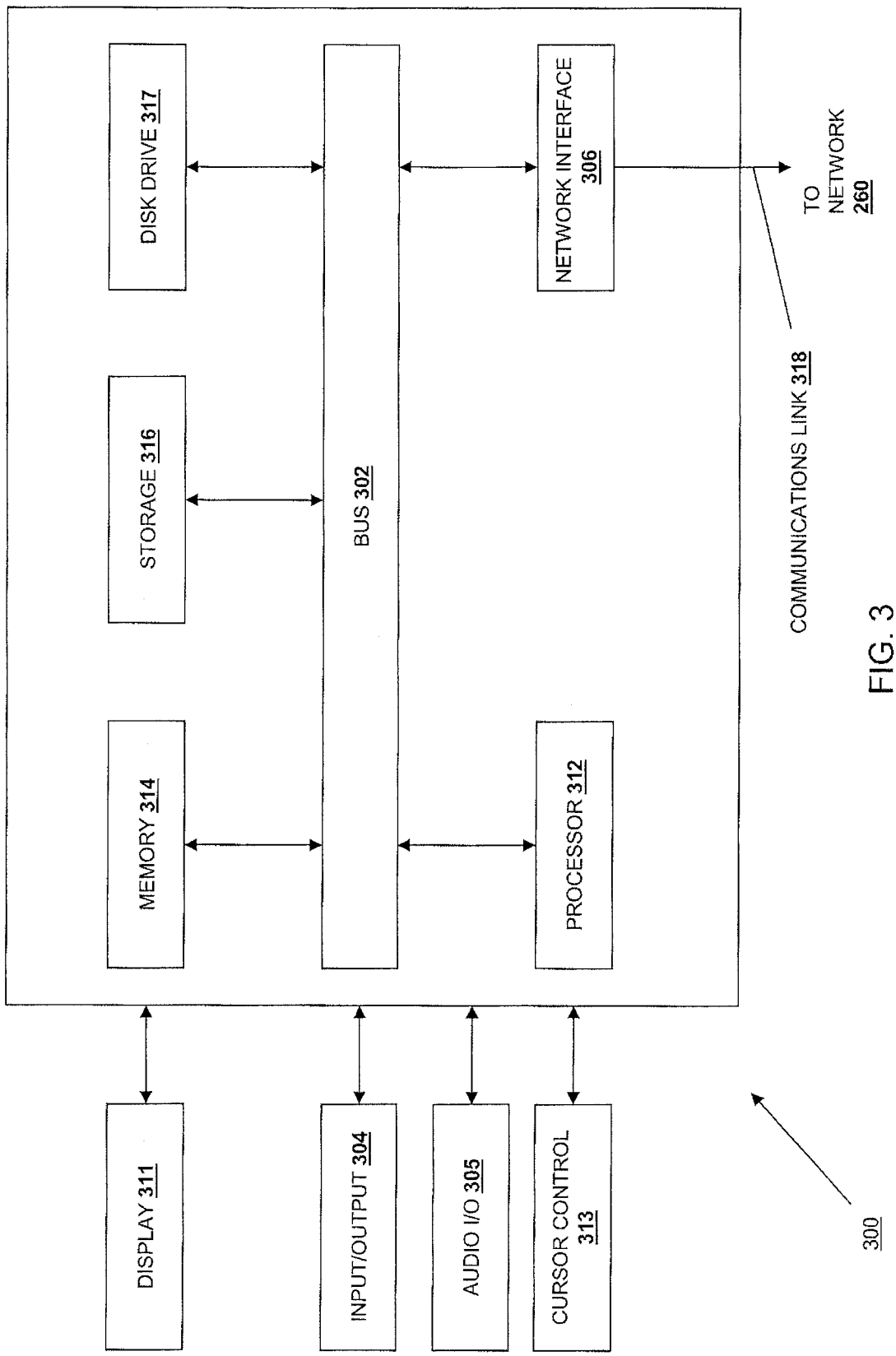
FIG. 3 is a block diagram of a computer system suitable for implementing one or more components in FIG. 2 according to one embodiment of the present disclosure.

FIG. 3 is a block diagram of a computer system 300 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The payment provider may utilize a network computing device (e.g., a network server) capable of communicating with the network. It should be appreciated that each of the devices utilized by users and service providers may be implemented as computer system 500 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display 311 and a cursor control 313 (such as a keyboard, keypad, mouse, etc.). An optional audio input/output component 305 may also be included to allow a user to use voice for inputting information by converting audio signals. Audio I/O component 305 may allow the user to hear and transmit audio. A transceiver or network interface 306 transmits and receives signals between computer system 300 and other devices, such as another user device, a merchant server, or a payment provider server via network 260. In one embodiment, the transmission is wireless, although other transmission mediums and methods may also be suitable. A processor 312, which can be a micro-controller, digital signal processor (DSP), or other processing component, processes these various signals, such as for display on computer system 300 or transmission to other devices via a communication link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314.

Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a transceiver for:
      transmitting a random sequence to a user device associated with a user,
      causing to be displayed on the user device a request for the user to insert the random sequence into a specific location of a user credential, and
      receiving the random sequence within the user credential from the user through the user device, wherein the random sequence is included in the user credential by the user so that the random sequence and the user credential are both present; and
   a processor for:
      separating the user credential from the random sequence, and
      determining whether the user credential separated from the random sequence matches an expected credential associated with the user.

2. The system of claim 1, wherein the processor further generates the random sequence before the transceiver transmits the random sequence.

3. The system of claim 1, wherein the random sequence comprises a combination of letters, numbers, characters, and/or symbols.

4. The system of claim 1, wherein the user credential is a password or personal identification number (PIN).

5. The system of claim 1, wherein the random sequence comprises a random number of characters and a random combination of characters.

6. The system of claim 1, wherein the random sequence comprises a random number of characters, a random combination of characters, and a random specific location.

7. The system of claim 1, wherein the random sequence is based on the user credential.

8. The system of claim 1, wherein the specific location is at the beginning of the user credential.

9. The system of claim 1, wherein the specific location is at the end of the user credential.

10. The system of claim 1, wherein the specific location is within the user credential.

11. A system comprising:
    a memory storing a user credential associated with an account of the user; and
    one or more hardware processors in communication with the memory and configured for:
       transmitting a random sequence to the user;
       causing to be provided one or more specific locations of the user credential for the user to insert the random sequence either wholly or in pieces;
       receiving information comprising the random sequence and the user credential, wherein the random sequence is included in the user credential by the user so that the random sequence and the user credential are both present in the information;
       extracting the user credential from the information; and
       determining whether the extracted user credential matches the user credential associated with the account of the user.

12. The system of claim 11, wherein the random sequence comprises a random number of characters and a random combination of characters.

13. The system of claim 11, wherein the random sequence comprises a random number of characters, a random combination of characters, and a random specific location.

14. The system of claim 11, wherein the random sequence is based on the user credential.

15. The system of claim 11, wherein the specific location is at the beginning or the end of the user credential.

16. The system of claim 11, wherein the specific location is within the user credential.

17. A method comprising:
   transmitting, by a computer system to a user device, a random sequence to a user device;
   requesting the user to insert the random sequence into or at a specific location of a user credential;
   receiving, electronically by the computer system, the random sequence and the user credential from the user through the user device, wherein the random sequence is included in the user credential by the user so that the random sequence and the user credential are both present;
   separating the user credential and the random sequence; and
   determining whether the separated user credential matches an expected credential associated with the user.

18. The method of claim 17, further comprising:
   transmitting a Captcha phrase;
   receiving a user-entered Captcha phrase; and
   verifying the user-entered Captcha phrase matches the transmitted Captcha phrase prior to transmitting the random sequence to the user device.

19. The method of claim 17, wherein the receiving comprises receiving a hash value from the random sequence included in the user credential.

20. The method of claim 19, wherein the separating comprises determining whether the received hash value is what is expected.

* * * * *